United States Patent

Nimerick et al.

Patent Number: 5,259,455
Date of Patent: Nov. 9, 1993

[54] METHOD OF USING BORATE CROSSLINKED FRACTURING FLUID HAVING INCREASED TEMPERATURE RANGE

[76] Inventors: Kenneth H. Nimerick, 5535 S. 76th E. Ave.; Curtis W. Crown, 7055 E. 52nd Pl., both of Tulsa, Okla. 74145; S. Bruce McConnell, 22423 N. Rebecca Buewell La., Katy, Tex. 77449; Brian Ainley, 1208 E. Dover St., Broken Arrow, Okla. 74012

[21] Appl. No.: 885,934

[22] Filed: May 18, 1992

[51] Int. Cl.$^5$ ............................................ E21B 43/26
[52] U.S. Cl. ............................................... 166/308
[58] Field of Search ....................... 166/300, 308; 252/8.551

[56] References Cited

U.S. PATENT DOCUMENTS

| | | | |
|---|---|---|---|
| 2,672,935 | 3/1954 | Braunlich, Jr. et al. | 252/8.551 X |
| 3,215,634 | 11/1965 | Walker | 252/8.551 X |
| 3,974,077 | 8/1976 | Free | 252/8.551 |
| 3,988,246 | 10/1976 | Hartfiel | 252/8.551 X |
| 4,514,309 | 4/1985 | Wadhwa | 166/308 X |
| 4,619,776 | 10/1986 | Mondshine | 252/8.551 |
| 5,160,445 | 11/1992 | Sharif | 252/8.551 |
| 5,165,479 | 11/1992 | Harris et al. | 166/300 |

*Primary Examiner*—George A. Suchfield
*Attorney, Agent, or Firm*—Stephen A. Littlefield

[57] ABSTRACT

The present invention extends the temporary temperature range for the use of magnesium oxide-delayed borate-cross linking of a galactomannan gum fracturing fluid by adding fluoride ion which precipitates insoluble magnesium fluoride. Alternatively, a chelant for the magnesium ion may be added. With the precipitation of magnesium fluoride, or the chelation of the magnesium ion, insoluble magnesium hydroxide cannot form at elevated temperatures which would otherwise lower the pH and reverse the boron-crosslinking reacting. The addition effectively extends the use of such fracturing fluids to temperatures of about 275° to 300° F.

6 Claims, No Drawings

METHOD OF USING BORATE CROSSLINKED FRACTURING FLUID HAVING INCREASED TEMPERATURE RANGE

This invention relates to the art of recovery of hydrocarbon fluids from subterranean formations, and particularly, to a fracturing process and fluid used in such fracturing process.

BACKGROUND OF THE INVENTION

In the art of recovering hydrocarbon values from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a water or oil base fluid incorporating a polymeric thickening agent. The polymeric thickening agent helps to control leak-off of the fracturing fluid into the formation, aids in the transfer of hydraulic fracturing pressure to the rock surfaces and, primarily, permits the suspension of particulate proppant materials which remain in place within the fracture when fracturing pressure is released, thereby holding the fracture open and providing a more conductive flow path for the hydrocarbon fluids to the wellbore.

Typical polymeric thickening agents for use in fracturing fluids comprise galactomannan gums such as guar and substituted guars such as hydroxypropyl guar or carboxymethylhydroxypropyl guar. Cellulosic polymers such as hydroxyethyl cellulose may also be used as well as synthetic polymers such as polyacrylamide. To increase the viscosity and, thus, the proppant carrying capacity as well as to increase the high temperature stability of the fracturing fluid, crosslinking of the polymers is also commonly practiced. Typical crosslinking agents comprise soluble boron, zirconium or titanium compounds. These metal ions provide for crosslinking or tying together of the polymer chains to increase the viscosity and improve the rheology of the fracturing fluid.

Of necessity, fracturing fluids are prepared on the surface and then pumped through tubing in the wellbore to the hydrocarbon-bearing subterranean formation. While high viscosity is a desirable characteristic of a fluid within the formation in order to efficiently transfer fracturing pressures to the rock as well as to reduce fluid leak-off, large amounts of hydraulic horsepower are required to pump such high viscosity fluids through the well tubing to the formation. I order to reduce the friction pressure, various methods of delaying the crosslinking of the polymers in a fracturing fluid have been developed. This allows the pumping of a relatively less viscous fracturing fluid having relatively low friction pressures within the well tubing with crosslinking being effected at or near the subterranean formation so that the advantageous properties of the thickened crosslinked fluid are available at the rock face.

One typical delayed crosslinking fracturing fluid system comprises borate crosslinked galactomannan gums such as guar or hydroxypropyl guar (HPG). The galactomannan polymers are generally provided to a blender in solid, powder form, or more typically, suspended in a hydrocarbon such as kerosene or diesel. When added to a neutral or acidic aqueous solution, the galactomannan gum hydrates to form a gel Hydration of guar and HPG can best be achieved under neutral or acidic conditions, that is, at a pH of about 7 or less. Under these pH conditions, no crosslinking of guar or HPG will occur with borate ion. In order to effect borate crosslinking of guar and HPG, the pH must be raised to at least 9.5. It is this raising of the p requirement which has been exploited in the prior art to effect a delay in the crosslinking of galactomannan gums by borate ion.

One typical mechanism for delaying the elevation of the pH is to us a low-solubility base such as magnesium oxide (MgO). MgO is added to the hydrated, near neutral or slightly acidic galacatomannan gum solution along with a boron releasing compound. Since the solution is initially near neutral or slightly acidic, there is no crosslinking of the polymers effected by the presence of boron (or borate ion) in solution. As the MgO slowly solubilizes in the system, the pH is gradually raised according to the following reaction:

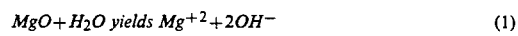

$$MgO + H_2O \text{ yields } Mg^{+2} + 2OH^- \qquad (1)$$

It is also been suggested that the solubilization of the MgO be further delayed by dispersing solid particulate MgO in hydrocarbon droplets with a surfactant which further slows the solubilization of the MgO.

The borate crosslinking of a galactomannan gum is, however, a reversible reaction should the pH of the solution drop below the required pH of about 9.25 over a period of time. At temperatures of above about 200° F., magnesium ion combines with hydroxide ion to produce insoluble magnesium hydroxide which causes a lowering of the pH of the fracturing fluid, and which in turn, destabilizes the fluid through breaking of the borate crosslink. Thus, the use of borate crosslinked galactomannan gums in fracturing high temperature formations above about 200° F. is limited by the high pumping friction pressures required to pump a stable non-delayed (pH adjusted with NaOH) borate-crosslinked fluid. The advantages of good clean up and removal of borate crosslinked galactomannan gums as well as their lower cost cannot be effectively employed above these temperatures.

SUMMARY OF THE INVENTION

The present invention provides a fracturing fluid and method of fracturing which allows the delay of borate crosslinking of a galactomannan gum fracturing fluid for use at temperatures well above the former 200° F. temperature limitation of prior art systems.

In accordance with the invention, a fracturing fluid for fracturing subterannean formations comprises an aqueous hydrated galactomannan gum solution, a boron-releasing crosslinking agent, slowly soluble magnesium oxide to effect the elevation of the pH of the solution and an effective amount of a material which chemically inactivates magnesium ions in solution at elevated temperatures thereby preventing a lowering of the pH and reversal of the crosslinking action of the boron.

Further in accordance with the invention, a fracturing fluid for fracturing subterranean formations comprises an aqueous hydrated galactomannan gum solution, a boron-releasing crosslinking agent, slowly soluble magnesium oxide to effect the elevation of the pH of the solution and an effective amount of a complexing agent which complexes with magnesium ion in solution at elevated temperatures thereby preventing the formation of insoluble magnesium hydroxide and a lowering of the pH and reversal of the crosslinking action of the boron.

Further in accordance of the invention, a fracturing fluid for fracturing subterranean formations comprises an aqueous hydrated galactomannan gum solution, a boron-releasing crosslinking agent, slowly soluble MgO to effect the elevation of the pH of the solution and an effective amount of a fluoride ion-releasing compound to effect precipitation of insoluble magnesium fluoride at elevated temperatures, thereby preventing a lowering of the pH and the reversal of the crosslinking action of the boron.

Further in accordance with the invention, the above fracturing fluid includes an effective amount of a soluble metal fluoride compound.

Still further in accordance with the invention, a method of fracturing comprises providing a fracturing fluid comprising an aqueous solution of a galactomannan gum, a boron-releasing compound, an amount of magnesium oxide effective to raise the pH to at least 9.25 and further including the step of adding an effective amount of a fluoride ion-releasing compound and pumping the fracturing fluid into a subterranean formation at fracturing pressures.

It is therefore an object of this invention to provide a fracturing fluid including a delayed crosslinking mechanism relying on the slow solubility of magnesium oxide which does not result in a lowering of pH and the consequent reversal of boron crosslinking at elevated temperatures.

It is another object of this invention to provide a method of fracturing a subterranean formation using a delayed borate crosslinked galactomannan gum solution at temperatures above about 200° F.

DETAILED DESCRIPTION OF THE PREFERRED EMBODIMENTS

These and other objects of the invention are accomplished in the manner to be described hereinafter in conjunction with a description of preferred embodiments in the invention. It will be understood by those skilled in the art that variations of the embodiments disclosed are possible and included within the scope of the present invention.

It is well known in the art to delay the boron crosslinking of a galactomannan gum by slowly raising the pH from the acidic aqueous solution required for hydration of the galactomannan gum using a slowly soluble base such as magnesium oxide (MgO) in accordance with reaction (1) previously described.

It is also known that at elevated temperatures in the range of 150° to 200° F. that magnesium ion combines with available hydroxide at elevated pH to create insoluble magnesium hydroxide in accordance with reaction (2) as follows:

$$Mg^{+2} + 2OH^- \rightarrow Mg(OH)_2 \quad (2)$$

Obviously, the removal of hydroxide ion from solution through the precipitation of insoluble magnesium hydroxide effects a lowering of the pH of the solution. This, in turn, causes a reversal of the boron-crosslinking reaction once the pH drops below about 9.5, thereby lowering the viscosity of the fracturing fluid.

In accordance with one embodiment of the present invention, the precipitation of insoluble magnesium hydroxide at elevated pH is prevented by causing the magnesium ion to preferentially combine with fluoride ion added to the fracturing fluid to preferentially precipitate insoluble magnesium fluoride in accordance with the following reaction:

$$Mg^{+2} + 2OH^- + 2F^- + 2M^+ \rightarrow MgF_2 \downarrow 2M^+ + 2OH^- \quad (3)$$

With the removal of the magnesium ion in accordance with the reaction (3), above, the pH of the fracturing fluid is unaffected thereby avoiding the temperature-limiting reversal of the boron-crosslinking reaction. This addition effectively extends the operating range for a boron-crosslinked galactomannan gum solution well above 200° F. to the range of about 275° F. to 300° F.

In accordance with the invention, any soluble fluoride ion-releasing compound may be used to effect the precipitation of the magnesium in accordance with reaction (3). In this regard, the fluoride ion-releasing compound may be any soluble metal fluoride salt, particularly alkali metal salts such as, preferably, sodium or potassium fluoride, ammonium fluoride or bifluoride or an organic salt which is capable of releasing fluoride ion.

An effective amount of the fluoride ion-releasing compound is added to the fracturing fluid. In the preferred embodiment, an effective amount comprises about 2 moles of fluoride ion to react with one mole of the available magnesium added to the fracturing fluid in the form of magnesium oxide. In its most preferred form, a slight excess over a stoichiometric amount of fluoride ion-releasing compound is added (3 moles fluoride ion to 1 mole magnesium ion).

In accordance with another embodiment of the present invention, precipitation of insoluble magnesium hydroxide at elevated pH is prevented by chelation of the magnesium ion to avoid the precipitation of insoluble magnesium hydroxide. The effect on the pH is substantially identical to that of the precipitation of the magnesium ion as insoluble magnesium fluoride a previously described. There is no lowering of the pH and, therefore, no reversal of the boron-crosslinking reaction. The addition of a chelant effectively extends the operating range for a boron-crosslinked galactomannan gum solution well above 200° F. to the range of about 275° to 300° F. Chelants which may be used in accordance with this embodiment of the invention include ethylenediaminetetraacetic acid and its sodium salts citric and lactic acids and their alkali metal salts and oxalic acid and its soluble salts.

While the invention has been described in the more limited aspects of preferred embodiments thereof, other embodiments have been suggested and still others will occur to those skilled in the art upon a reading and understanding of the foregoing specification. It is intended that all such embodiments be included within the scope of this invention and limited only by the appended claims.

Having thus described our invention, we claim:

1. In a method of fracturing a subterranean formation using a hydrated galactomannan gum solution including magnesium oxide wherein the galactomannan gum is cross linked with boron and the pH is maintained at a level of at least 9.25, the improvement which comprises adding an effective amount of fluoride ion-releasing compound to precipitate insoluble magnesium fluoride at elevated temperatures and pumping the hydrated galactomannan gum solution into the subterranean formation at fracturing pressure.

2. The method of fracturing as set forth in claim 1 wherein the step of adding comprises adding an effective amount of a soluble metal fluoride salt.

3. The method of fracturing as set forth in claim 2 wherein the step of adding comprises adding an alkaline metal fluoride salt.

4. The method of fracturing as set forth in claim 3 wherein the step of adding comprises adding potassium fluoride.

5. The method of fracturing as set forth in claim 1 wherein said step of adding comprises adding ammonium fluoride.

6. The method of fracturing as set forth in claim 1 wherein said step of adding comprises adding ammonium bifluoride.

* * * * *

UNITED STATES PATENT AND TRADEMARK OFFICE
CERTIFICATE OF CORRECTION

PATENT NO. : 5,259,455
DATED : Nov. 9, 1993
INVENTOR(S) : Kenneth H. Nimerick; Curtis W. Crown; S. Bruce McConnell; Brian Ainley It is certified that error appears in the above-identified patent and that said Letters Patent are hereby corrected as shown below:

Title page, item [76]: inventor named "Curtis W. Crown" should be corrected to read --Curtis W. Crowe--

Signed and Sealed this

Ninth Day of May, 1995

*Attest:*

BRUCE LEHMAN

*Attesting Officer*  *Commissioner of Patents and Trademarks*